(12) United States Patent
Aoki

(10) Patent No.: US 7,699,565 B2
(45) Date of Patent: Apr. 20, 2010

(54) RADIUS ENDMILL

(75) Inventor: Wataru Aoki, Nagoya (JP)

(73) Assignees: OSG Corporation, Aichi (JP); BTT Corporation, Aichi (JP)

( * ) Notice: Subject to any disclaimer, the term of this patent is extended or adjusted under 35 U.S.C. 154(b) by 359 days.

(21) Appl. No.: 11/596,166

(22) PCT Filed: Nov. 4, 2005

(86) PCT No.: PCT/JP2005/020301

§ 371 (c)(1),
(2), (4) Date: Nov. 10, 2006

(87) PCT Pub. No.: WO2006/103799

PCT Pub. Date: Oct. 5, 2006

(65) Prior Publication Data

US 2008/0273932 A1    Nov. 6, 2008

(30) Foreign Application Priority Data

Mar. 28, 2005 (JP) .............................. 2005-092485

(51) Int. Cl.
  B23C 5/10    (2006.01)
  B23C 51/00   (2006.01)
(52) U.S. Cl. .............................. 407/53; 407/54; 407/60
(58) Field of Classification Search ................... 407/53, 407/54, 60, 61, 62, 64
See application file for complete search history.

(56) References Cited

FOREIGN PATENT DOCUMENTS

| DE | 20002601 U1 | 5/2000 |
|----|----|----|
| JP | 2-106209 | 4/1990 |
| JP | 10-230407 | 9/1998 |
| JP | 2004-141975 | 5/2004 |
| JP | 2004-188516 | 7/2004 |
| JP | 2005-28519 | 2/2005 |

Primary Examiner—Will Fridie, Jr.
(74) Attorney, Agent, or Firm—Muramatsu & Associates

(57) ABSTRACT

A radius endmill has a peripheral cutting edge, a bottom cutting edge, and a rounded corner cutting edges whose ridge line is defined by a circular arc having a given radius as measured in a side view of the endmill that is parallel to the axis. The rounded corner cutting edge is located in a corner portion of the endmill in which the outer peripheral and the axial end intersect each other such that the peripheral cutting edge and the bottom cutting edge are connected to each other through the rounded corner cutting edge. The bottom cutting edge has a radially inner end lying at the axis, and a radially outer end at which the bottom cutting edge is connected to the rounded corner cutting edge. The bottom cutting edge is curved such that its ridge line is defined by a circular arc as seen in a plan view of the endmill that is perpendicular to the axis.

12 Claims, 8 Drawing Sheets

F I G. 8
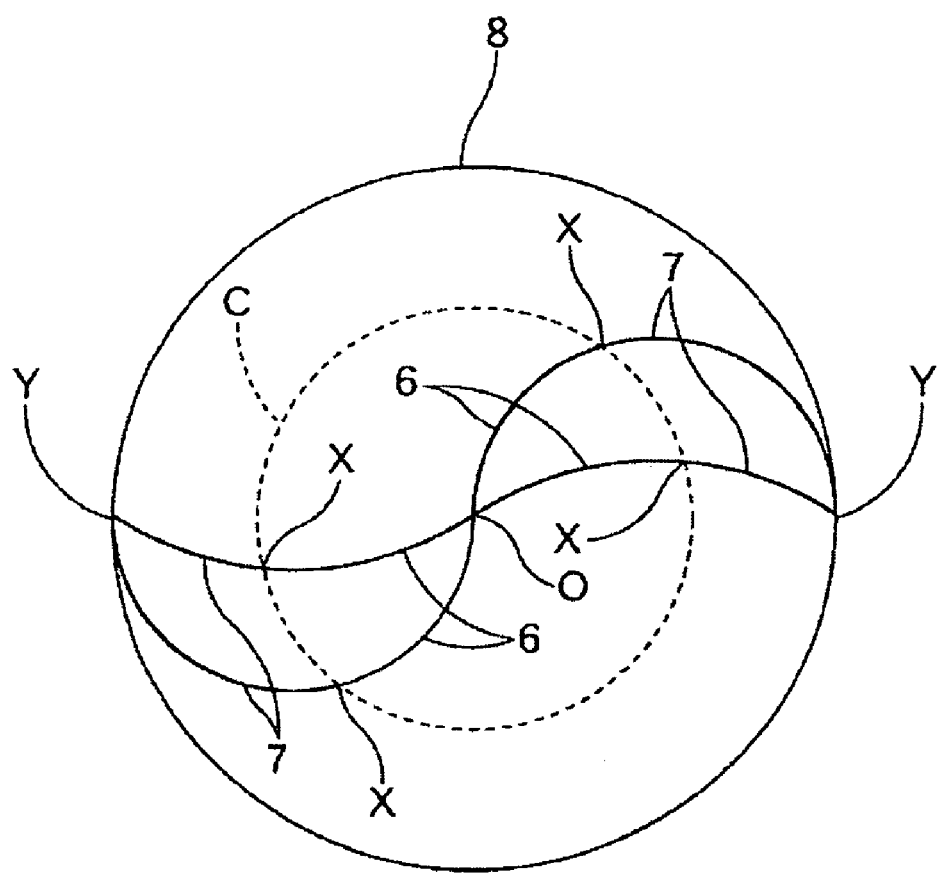

PRIOR ART

PRIOR ART

PRIOR ART

RADIUS ENDMILL

TECHNICAL FIELD

The present invention relates to a radius endmill, and more particularly to such a radius endmill which is used for performing a die mold machining, i.e., for machining a three-dimensional curved surface of a product (such as fording die, press die, die casting mold and resin forming die) in a machine tool, and which has a substantially cylindrical shape as a whole and includes rounded corner cutting edges (substantially arcuate shaped cutting edges) formed in a corner portion at which its peripheral cutting edges are connected to its bottom cutting edges.

BACKGROUND ART

For reducing a manufacturing time and an environmental problem in a die mold machining, it is preferable that the die mold machining is performed by a numerically-controlled cutting machine tool as much as possible, rather than by an electric discharge machining that requires a long machining time and an electrolyte. However, an increase in a required depth of cut and the consequent increase in an overhang length of a cutting tool make it difficult to perform the cutting operation, thereby increasing dependency on the electric discharge machining. Further, where the tool overhang length is large, a large number of revolutions of the cutting tool is likely to cause a chattering problem. Although the chattering problem could be avoided by reducing the number of revolutions of the cutting tool, the machining would be performed with an efficiency considerably reduced due to a feed rate (i.e., feed amount per time unit) that is necessarily reduced by the reduction in the number of revolutions. Thus, conventionally, there has not been expected a high performance of a cutting operation in a die mold machining.

In recent years, as a measure for solving the above problem, there was developed a radius endmill that has a high rigidity permitting a cutting operation to be performed with a remarkably increased feed amount per tooth. That is, such a radius endmill is capable of performing a cutting operation at a high feed rate even with a relatively low number of revolutions, thereby enabling the cutting operation to exhibit a high performance in the machining efficiency.

In such a conventional radius endmill, as shown in FIG. 9 that is a perspective view showing a major portion of the radius endmill and also FIG. 10 that is a plan and side view showing ridge lines of bottom cutting edges of the endmill, the ridge line 6 of each of the bottom cutting edges 4 extends from a center C of an axial end portion 3 to its free end X at which the ridge line 6 is connected to the ridge line 7 of a corresponding one of the rounded corner cutting edges 5, and is constituted by a straight line.

Further, the ridge line 7 of each of the rounded corner cutting edges 5 extends from the free end X at which the ridge line 6 of a corresponding one of the bottom cutting edges 4 is connected to the ridge line 7 of the each rounded corner cutting edge 5, to a free end Y at which the ridge line 7 of the each rounded corner cutting edge 5 is connected to a ridge line 8 of a corresponding one of peripheral cutting edges 2, and is constituted by a circle of curvature having a convex circular arc shape and a predetermined curvature as seen in a side view that is parallel to an axis of the radius endmill. In the conventional radius endmill, as shown in FIG. 10, centers of curvature of each of the rounded corner cutting edges 5 lie on an imaginary transverse plane CS located in a position that is distant from the free end X by a distance equal to a radius of each of the rounded corner cutting edges 5 in a direction of a rotation axis (in a depth direction) of the radius endmill. The centers of curvature of each rounded corner cutting edge 5 lie on a predetermined portion of an imaginary circle C whose diameter corresponds to a value (=D−2R) that is obtained by subtracting twice the radius (=2R) of each rounded corner cutting edge 5 from the diameter D of the outer peripheral portion 1. For example, as shown in FIG. 10, the centers of curvatures of the ridge line 7 at points a1, a3 lie on respective points b1, b3. That is, the centers of curvatures of the ridge line 7 lie on the predetermined portion of the imaginary circle C (ranging from the point b1 to the point b3).

During the cutting operation, as shown in FIG. 11, each bottom cutting edge 4 is, upon its cutting contact with arbitrary points p1, p2 of a workpiece, moving in a direction perpendicular (orthogonal) to a line passing through the points p1, p2, since the ridge line 6 of each bottom cutting edge 4 is constituted by the straight line, namely, since a radial rake of each bottom cutting edge 4 is neither positive nor negative. Further, in a micro analysis of a cutting action of each cutting edge, each bottom cutting edge 4 and the corresponding rounded corner cutting edge 5 (contiguous to the each bottom cutting edge 4) are substantially concurrently brought into cutting contact with the arbitrary points p1, p2, p3, p4 of the workpiece. In a micro analysis of cutting actions of each adjacent pair of cutting edges, each bottom cutting edge 4 and the corresponding rounded corner cutting edge 5 are in intermittent contact with the workpiece, and intermittently perform the cutting operation.

Thus, since the ridge line 6 of each bottom cutting edge 4 is constituted by the straight line, a length of the ridge line 6 of each bottom cutting edge 4 and a length of the ridge line 7 of each rounded corner cutting edge 5 are made small. Further, as described above, each bottom cutting edge 4 is moving in the perpendicular direction upon its cutting contact with the arbitrary points p1, p2 of the workpiece. Each cutting edge is substantially concurrently brought into contact with the arbitrary points p1, p2, p3, p4 of the workpiece. Each cutting edge is intermittent contact with the workpiece, so as to intermittently perform the cutting operation. Therefore, in the conventional radius endmill in which each bottom cutting edge 4 and each rounded corner cutting edge 5 receive a large load during the cutting operation, there is limitation as to improvement in durability of the cutting tool.

Further, in the conventional radius endmill, where a cutting operation is performed with a considerably increased feed amount per tooth, each of produced chips is considerably thick and heavy, as shown in FIG. 12, whereby an axial component of cutting force acting one the radius endmill is made large. Where such a cutting operation performed with the considerably increased feed amount is a deep milling operation, all the produced chips are not likely to be evacuated from each flute of the endmill, so that some of the produced chips remaining in each flute could interfere each cutting edge and the workpiece, thereby causing risks of breakage of the endmill and defectiveness of a machined surface of the workpiece. Further, for facilitating evacuation of the chips, there is necessity of use of cutting fluid, which could induce an environmental problem. It is noted that there is patent document 1, for example, as a prior art document disclosing the above-described conventional radius endmill.

Patent document 1: JP-2004-141975A

DISCLOSURE OF INVENTION

Object to be Solved by the Invention

The present invention was developed for solving the technical problems as described above, and has an object to provide a radius endmill having a construction which leads to reduction in cutting resistance acting on the tool and the consequent improvement in durability of the tool, which permits each of produced chips to have reduced thickness and weight and accordingly facilitating smooth evacuation of the produced chips even without use of cutting fluid, thereby making it possible to prevent breakage of the tool and defectiveness of the machined surface that could be caused if the tool and the machined surface were interfered by the produced chips, and which enables the tool to perform an eco-friendly cutting operation.

Measures for Achieving the Object

The radius endmill of the present invention is, in a radius endmill having a substantially cylindrical shape as a whole, and including spiral-shaped peripheral cutting edges formed in an outer peripheral portion thereof, bottom cutting edges formed in an axial end portion thereof, and rounded corner cutting edges formed in a corner portion at which the peripheral cutting edges are connected to the bottom cutting edges, characterized in that: a ridge line of each of the bottom cutting edges extends from a center of the axial end portion to a free end thereof at which the ridge line is connected to a ridge line of a corresponding one of the rounded corner cutting edges, and is constituted by a circle of curvature having a convex circular arc shape as seen in a plan view that is perpendicular to an axis of the radius endmill.

In the present invention in which the ridge line of each bottom cutting edge is constituted by the circle of curvature having the convex circular arc shape as seen in the plan view, the ridge line of each bottom cutting edge has a length larger than in a conventional radius endmill in which the ridge line of each bottom cutting edge is constituted by a straight line. The increase in the length of the ridge line alleviates a load acting on each bottom cutting edge during a cutting operation, since the load is dispersed over an increased area, so that the durability of the tool is improved. Further, since the ridge line of each bottom cutting edge is constituted by the convex-circular-arc-shaped curved line, during the cutting operation, each bottom cutting edge is, upon its cutting contact with an arbitrary point of a workpiece, moving in an oblique direction, rather than in a perpendicular direction as in the above-described conventional radius endmill, thereby leading to reduction in cutting resistance acting on each bottom cutting edge, permitting each of produced chips to have reduced thickness and weight and accordingly facilitating smooth evacuation of the produced chips, and making it possible to prevent breakage of the tool and defectiveness of the machined surface that could be caused if the tool and the machined surface were interfered by the produced chips.

In an arrangement in which a radius of curvature of the ridge line of each of the bottom cutting edges is one-quarter of a diameter D of the outer peripheral portion, the length of the ridge line of each bottom cutting edge is maximized. Thus, this arrangement can be considered as the best mode of the present invention. However, the radius of curvature of the ridge line of each bottom cutting edge may be in a range from one-half of the diameter D of the outer peripheral portion to one-quarter of the diameter D. The reason why the radius of curvature is not larger than one-half of the diameter D is that, if the radius of curvature is larger than one-half of the diameter D, the length of the ridge line is not much larger than where the ridge line is constituted by a straight line, whereby a sufficient improvement in performance cannot be expected.

Where the radius of curvature of the ridge line of each bottom cutting edge is in the above-described range from one-half of the diameter D to one-quarter of the diameter D, the ridge line of each rounded corner cutting edge (extending from the free end at which the ridge line of the corresponding bottom cutting edge is connected to the ridge line of the each rounded corner cutting edge, to a free end at which the ridge line of the each rounded corner cutting edge is connected to a ridge line of a corresponding one of peripheral cutting edges) is constituted by a circle of curvature having a convex circular arc shape and a curvature that is the same as a curvature of the ridge line of the corresponding bottom cutting edge as seen in the plan view of the radius endmill. The curvature of the ridge line of each rounded corner cutting edge as seen in the plan view is substantially the same as a curvature of the ridge line of each rounded corner cutting edge as seen in a side view of the radius endmill. Further, centers of curvature of each rounded corner cutting edge lie on an imaginary transverse plane located in a position that is distant from the free end of the ridge line of each bottom end cutting edge by a distance equal to a radius of each rounded corner cutting edge in a direction of a rotation axis of the radius endmill, and lie on a portion of an imaginary circle whose diameter corresponds to a value (=D−2R) obtained by subtracting twice the radius (=2R) of each rounded corner cutting edge from the diameter D of the outer peripheral portion, wherein the portion of the imaginary circle is from $\frac{1}{24}$ of the imaginary circle (subtending a central angle of 15°) to $\frac{1}{6}$ of the imaginary circle (subtending a central angle of 60°).

With the ridge line of each rounded corner cutting edge being constituted as described above, a length of the ridge line of each rounded corner cutting edge can be remarkably increased. Therefore, like the effects provided owing to the increase in the length of the ridge line of each bottom cutting edge, a load acting on each rounded corner cutting edge can be alleviated, since the load is dispersed over an increased area, so that the durability of the tool is improved.

BEST MODE FOR CARRYING OUT THE INVENTION

Hereinafter, there will be described embodiments of the present invention, with reference to the drawings.

FIG. 1 is a perspective view showing a major portion of a three-tooth (three-flute) radius endmill constructed according to an embodiment of the invention. FIG. 2 is a view for explaining bottom cutting edges and rounded corner cutting edges of the radius endmill. FIG. 3 is a view for explaining each rounded corner cutting edge of the radius endmill. FIG. 4 is a view for explaining effects of the radius endmill. FIG. 5 is a perspective view of a chip produced when the radius endmill is used. FIG. 6 is a view for explaining bottom cutting edges and rounded corner cutting edges of a three-tooth radius endmill according to a modification of the embodiment. FIG. 7 is a view for explaining bottom cutting edges and rounded corner cutting edges of a two-tooth (two-flute) radius endmill according to another embodiment. FIG. 8 is a view for explaining bottom cutting edges and rounded corner cutting edges of a two-tooth radius endmill according to a modification of the another embodiment.

As shown in FIG. 1, the three-tooth radius endmill has a substantially cylindrical shape as a whole, and is to be rotated about its rotation axis in a direction indicated by arrow in the figure. The radius endmill includes spiral-shaped peripheral cutting edges 2 formed in its outer peripheral portion 1, bottom cutting edges 4 formed in its axial end portion 3, and rounded corner cutting edges 5 formed in a corner portion at which the peripheral cutting edges 2 are connected to the bottom cutting edges 4.

Ridge lines 6 of the bottom cutting edges 4 and ridge lines 7 of the rounded corner cutting edges 5 are represented in a plan view, i.e., a left portion of FIG. 2. The ridge lines 6 of the bottom cutting edges 4 extend from a center O of the axial end portion 3 to an imaginary circle C indicated by broken line. The ridge lines 7 of the rounded corner cutting edges 5 extend from the imaginary circle C to the outer peripheral portion 1.

The ridge line 6 of each bottom cutting edge 4, extending from the center O of the axial end portion 3 to a free end X (lying on the imaginary circle C) at which the ridge line 6 is connected to the ridge line 7 of a corresponding one of the rounded corner cutting edges 5, is constituted by a circle of curvature having a convex circular arc shape as seen in the plan view. A radius of curvature of the ridge line 6 of each bottom cutting edge 4 is one-quarter of a diameter D of the outer peripheral portion 1, namely, is D/4. The ridge line 6 of each bottom cutting edge 4 has a height position that is gradually reduced by a small amount as viewed in a direction toward the center O of the axial end portion 3, as shown in a right portion of FIG. 2. In other words, the end portion 3 has a concave cone shape.

The ridge line 7 of each rounded corner cutting edge 5 extends from the above-described free end X to a free end Y at which the ridge line 7 of each rounded corner cutting edge 5 is connected to a ridge line 8 of the corresponding peripheral cutting edge 2, and is constituted by a circle of curvature having a convex circular arc shape and a curvature that is the same as a curvature of the ridge line 4 of the corresponding bottom cutting edge 6 as seen in the plan view, as shown in FIG. 2. Further, the curvature of the ridge line 7 of each rounded corner cutting edge 5 as seen in the plan view is substantially the same as a curvature of the ridge line 7 of each rounded corner cutting edge 5 as seen in a side view of the radius endmill.

Centers of curvature of each rounded corner cutting edge 5 lie on an imaginary transverse plane CS located in a position that is distant from the free end X by a distance equal to a radius of each rounded corner cutting edges 5 in a direction of the rotation axis (in a depth direction) of the radius endmill, as shown in FIG. 2. Further, the centers of curvature of each rounded corner cutting edge 5 lie on a portion of an imaginary circle C whose diameter corresponds to a value (=D−2R) obtained by subtracting twice the radius (=2R) of each rounded corner cutting edge 5 from the diameter D of the outer peripheral portion 1. As shown in FIG. 2, for example, the centers of curvature of the ridge lines 7 of the rounded corner cutting edges 5 at points a1, a2, a3, a4, a5 lie on respective points b1, b2, b3, b4, b5. The centers of curvature of the ridge line 7 of the rounded corner cutting edge 5 of each one of three teeth lie on the predetermined portion (ranging from the point b1 to the point b3) of the imaginary circle C. The ridge line 7 of the rounded corner cutting edge 5 and centers of curvature of the ridge line 7 can be represented in FIG. 3 in which the centers e1, e2, e3, . . . , en of curvature of the ridge line 7 at arbitrary points d1, d2, d4, . . . , dn lie on the imaginary transverse plane CS located in the position that is distant from the free end X in the direction of the rotation axis, and lie on the predetermined portion of the imaginary circle C whose diameter corresponds to D−2R, wherein the predetermined portion ranges from the point e1 to the point en and subtends a central angle θ (=60°).

In the conventional radius endmill of FIG. 9, on the other hand, the centers of the curvature of each rounded corner cutting edge 5 lie on a predetermined portion (ranging from the point b1 to the point b3) of the imaginary circle C that is relatively narrow, and the length of the ridge line 7 of each rounded corner cutting edge 5 is considerably smaller than in the present embodiment.

There will be next described effects provided by the radius endmill of the present embodiment, with reference to FIG. 4.

In the radius endmill of the present embodiment, as described above, the ridge line 6 of each bottom cutting edge 4, extending from the center O of the end portion 3 to the free end X, is constituted by the circle of curvature having the convex circular arc shape as seen in the plan view. Further, the ridge line 7 of each rounded corner cutting edge 5, extends from the free end X to the free end Y, and is constituted by the circle of curvature having the convex circular arc shape and the curvature that is the same as the curvature of the ridge line 4 of the corresponding bottom cutting edge 6 as seen in the plan view.

Therefore, as shown in FIG. 4, each bottom cutting edge 4 and each rounded corner cutting edge 5 are, upon their cutting contact with arbitrary points P1, P2, P3, P4 of a workpiece, moving in a direction oblique to a line passing through the points P1, P2, P3, P4, since the ridge line 6 of each bottom cutting edge 4 as well as the ridge line 7 of each rounded corner cutting edge 5 is constituted by the circle of curvature having the convex circular arc shape, namely, since a radial rake of each bottom cutting edge 4 as well as a radial rake of each rounded corner cutting edge 5 is negative. Further, there is a relationship satisfying a<b<c<d, where "a" represents an angle of inclination of the ridge line 6 at a point corresponding to the points P1, with respect to a radial line passing through the point corresponding to the points P1, "b" represents an angle of inclination of the ridge line 6 at a point corresponding to the points P2, with respect to a radial line passing through the point corresponding to the points P2, "c" represents an angle of inclination of the ridge line 7 at a point corresponding to the points P3, with respect to a radial line passing through the point corresponding to the points P3, and "d" represents an angle of inclination of the ridge line 7 at a point corresponding to the points P4, with respect to a radial line passing through the point corresponding to the points P4. That is, an absolute value of the radial rake of each bottom cutting edge 4 as well as the radial rake of each rounded corner cutting edge 5 is gradually increased as viewed in a direction away from the center O toward the outer peripheral portion 1. This construction leads to reduction in cutting resistance acting on the radius endmill, permitting each of produced chips to have reduced thickness and weight. Actually, as shown in FIG. 5, each of the chips produced in a cutting operation performed by using the radius endmill of FIG. 1 is sufficiently thinner and lighter than a chip shown in FIG. 12. Further, the reduction of each chip in thickness and weight facilitates smooth evacuation of the chip outside the endmill, and accordingly makes it possible to prevent breakage of the endmill and defectiveness of the machined surface which could be caused if the endmill and the machined surface were interfered by the produced chips.

In the above-described embodiment in which the radius of curvature of the ridge line 6 of each bottom cutting edge 4 is one-quarter of the diameter D of the outer peripheral portion 1, the length of the ridge line 6 of each bottom cutting edge 4 is maximized. Thus, the above-described embodiment can be considered as the best mode of the present invention. However, the radius of curvature of the ridge line 6 of each bottom cutting edge 4 may be in a range from one-half of the diameter D of the outer peripheral portion 1 to one-quarter of the diameter D, as shown in FIG. 6.

Where the radius of curvature of the ridge line 6 of each bottom cutting edge 4 is in the above-described range from one-half of the diameter D to one-quarter of the diameter D, the ridge line 7 of each rounded corner cutting edge 5 (extending from the free end X at which the ridge line 6 of the corresponding bottom cutting edge 4 is connected to the ridge line 7 of the each rounded corner cutting edge 5, to the free end Y at which the ridge line 7 of the each rounded corner cutting edge 5 is connected to the ridge line 8 of the corresponding peripheral cutting edge 2) is constituted by a circle of curvature having a convex circular arc shape and a curvature that is the same as a curvature of the ridge line 6 of the corresponding bottom cutting edge 4 as seen in the plan and side views. Further, as in the arrangement in which the radius of curvature of the ridge line 6 of each bottom cutting edge 4 is D/4, the centers of curvature of each rounded corner cutting edge 5 lie on an imaginary transverse plane CS located in a position that is distant from the free end X by a distance equal to a radius of each rounded corner cutting edge 5 in a direction of a rotation axis of the radius endmill, and lie on a portion of an imaginary circle C whose diameter corresponds to a value (=D−2R) obtained by subtracting twice the radius (=2R) of each rounded corner cutting edge 5 from the diameter D of the outer peripheral portion 1, wherein the portion of the imaginary circle C is from 1/24 of the imaginary circle C (subtending a central angle of 15°) to 1/6 of the imaginary circle C (subtending a central angle of 60°).

The reason why the radius of curvature is not larger than D/2 is that, if the radius of curvature is larger than D/2, the length of the ridge line 6 of each bottom cutting edge 4 is not much larger than where the ridge line 6 is constituted by a straight line, whereby a sufficient improvement in performance cannot be expected.

While the radius endmill is a three-tooth radius endmill in each of the above-described embodiments, the radius endmill may be a two-tooth radius endmill, as shown in FIG. 7 that is its plan view, in which the ridge line 6 of each bottom cutting edge 4 and the ridge line 7 of each rounded corner cutting edge 5 are constructed as in the above-described embodiments. It is noted that FIG. 7 corresponds to the left portion of FIG. 2 and that FIG. 8 corresponds to FIG. 6.

As described above, the radius endmill of each of the embodiments of the invention has a substantially cylindrical shape as a whole, and includes the spiral-shaped peripheral cutting edges 2 formed in the outer peripheral portion 1, the bottom cutting edges 4 formed in the axial end portion 3, and the rounded corner cutting edges 5 formed in the corner portion at which the peripheral cutting edges 2 are connected to the bottom cutting edges 4, wherein the ridge line 6 of each bottom cutting edge 4 extends from the center O of the axial end portion 3 to the free end X at which the ridge line 6 is connected to the ridge line 7 of the corresponding rounded corner cutting edge 5, and is constituted by the circle of curvature having the convex circular arc shape as seen in the plan view.

This construction permits the ridge line 6 of each bottom cutting edge 4 to have a length larger than in a conventional radius endmill in which the ridge line 6 of each bottom cutting edge 4 is constituted by a straight line. The increase in the length of the ridge line 6 alleviates a load acting on each bottom cutting edge 4 during a cutting operation, since the load is dispersed over an increased area, so that the durability of the tool is improved. Further, since the ridge line 6 of each bottom cutting edge 4 is constituted by the convex-circular-arc-shaped curved line, during the cutting operation, each bottom cutting edge 4 is, upon its cutting contact with the arbitrary points P1, P2, P3, P4 of the workpiece, moving in an oblique direction, rather than in a perpendicular direction as in the above-described conventional radius endmill, thereby leading to reduction in cutting resistance acting on each bottom cutting edge 4, permitting each of produced chips to have reduced thickness and weight and accordingly facilitating smooth evacuation of the produced chips, and making it possible to prevent breakage of the tool and defectiveness of the machined surface which could be caused if the tool and the machined surface were interfered by the produced chips.

BRIEF DESCRIPTION OF DRAWINGS

FIG. 8 A view for explaining bottom cutting edges and rounded corner cutting edges of a two-tooth radius endmill according to a modification of the another embodiment.

EXPLANATION OF REFERENCE SIGN

Figure 1:
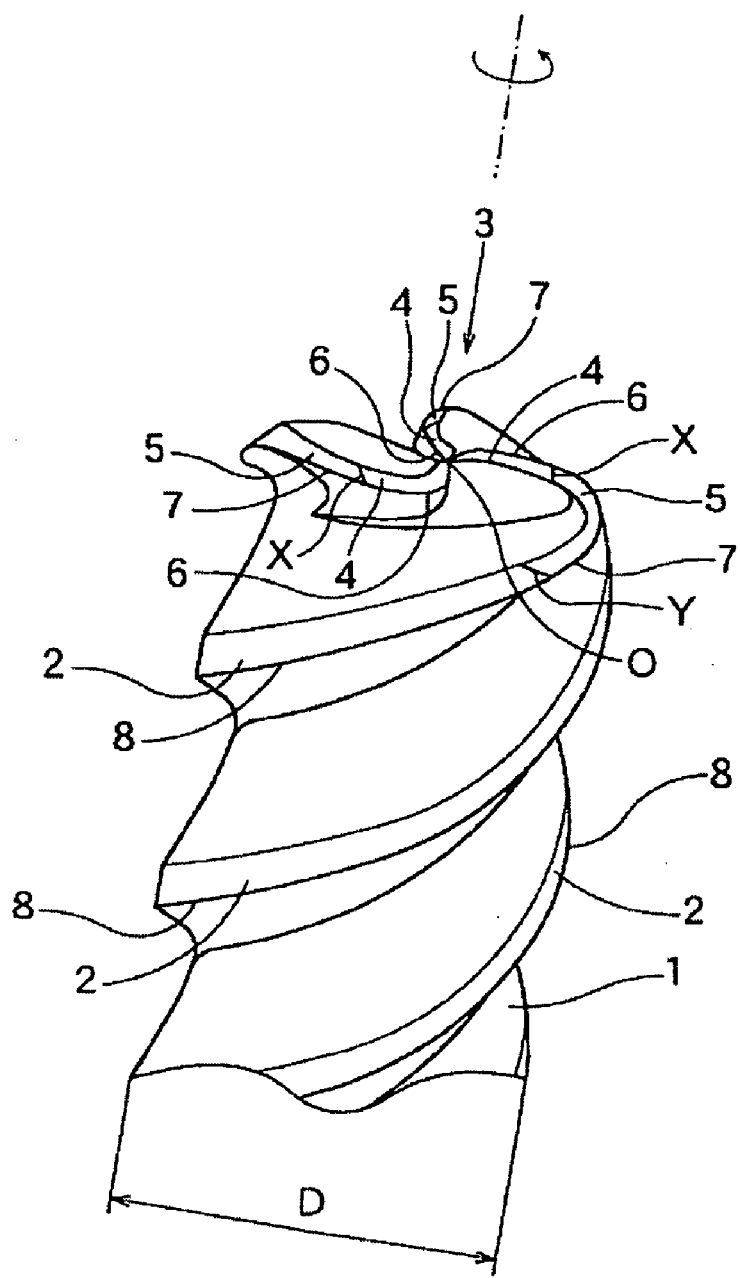
FIG. 1 A perspective view showing a major portion of a three-tooth radius endmill constructed according to an embodiment of the invention.
Figure 2:
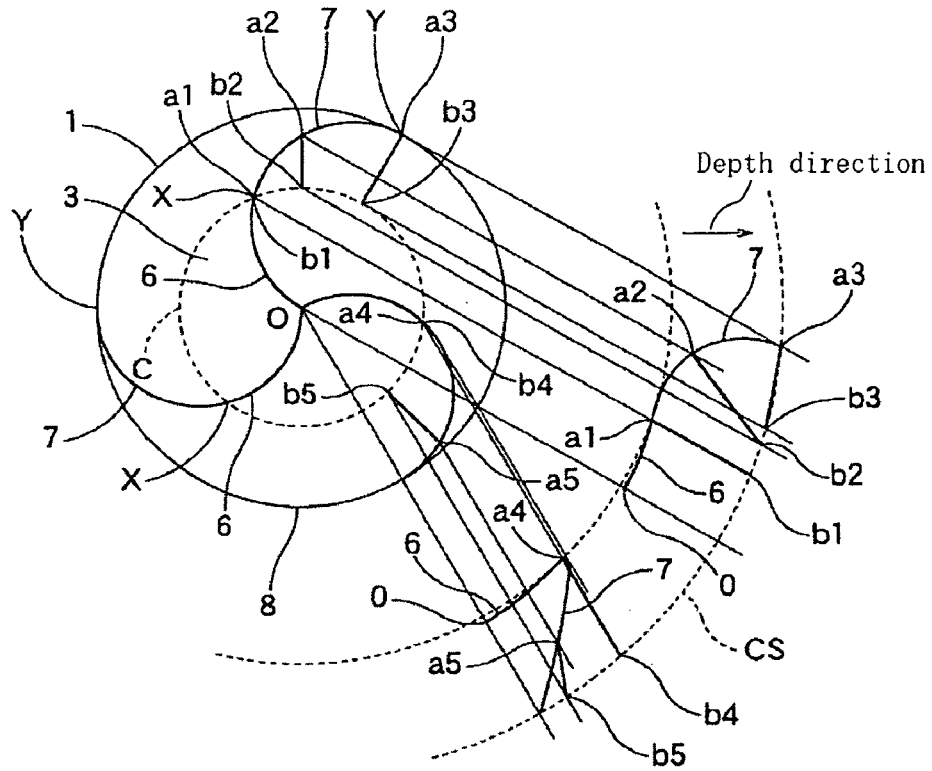
FIG. 2 A view for explaining bottom cutting edges and rounded corner cutting edges of the radius endmill.
Figure 3:
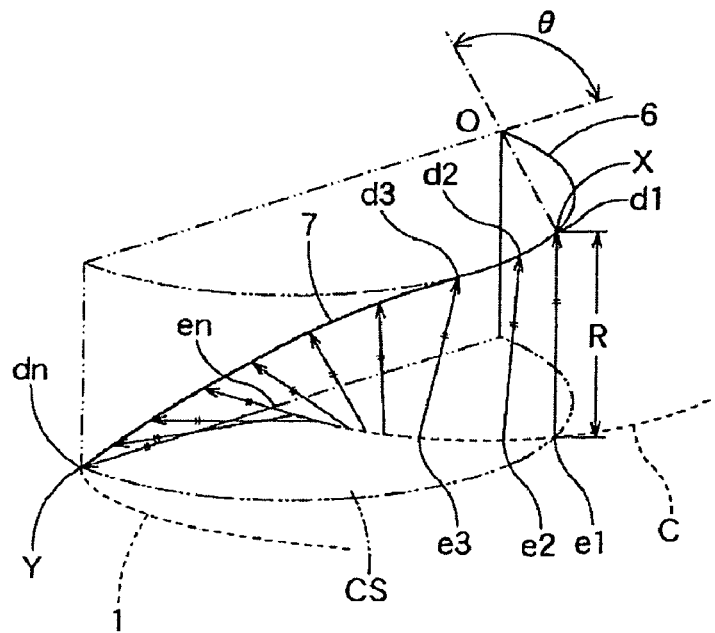
FIG. 3 A view for explaining each rounded corner cutting edge of the radius endmill.
Figure 4:
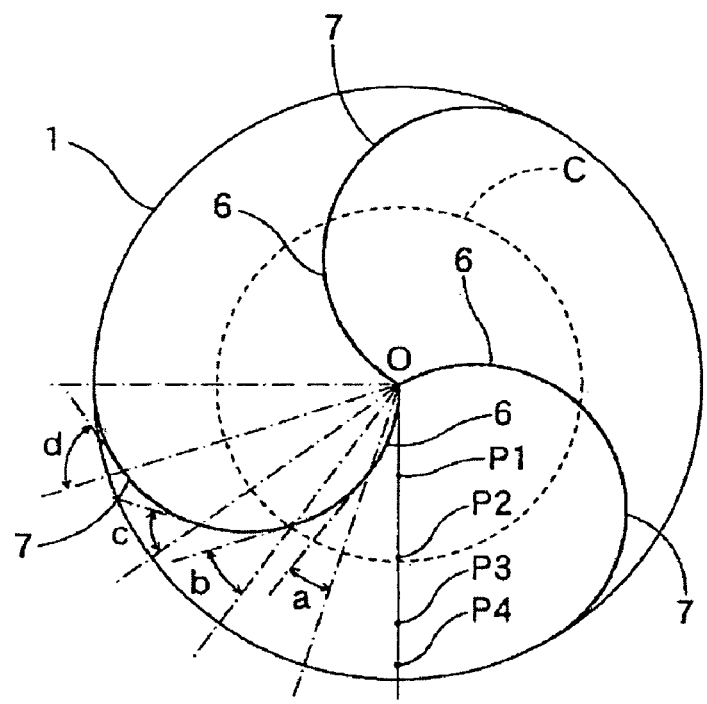
FIG. 4 A view for explaining effects of the radius endmill.
Figure 5:
FIG. 5 A perspective view of a chip produced in a cutting operation using the radius endmill.
Figure 6:
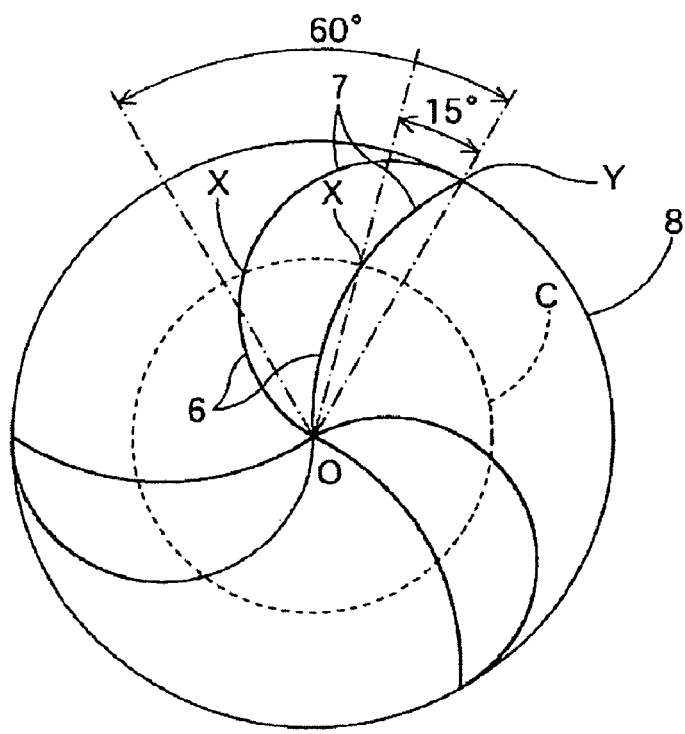
FIG. 6 A view for explaining bottom cutting edges and rounded corner cutting edges of a three-tooth radius endmill according to a modification of the embodiment.
Figure 7:
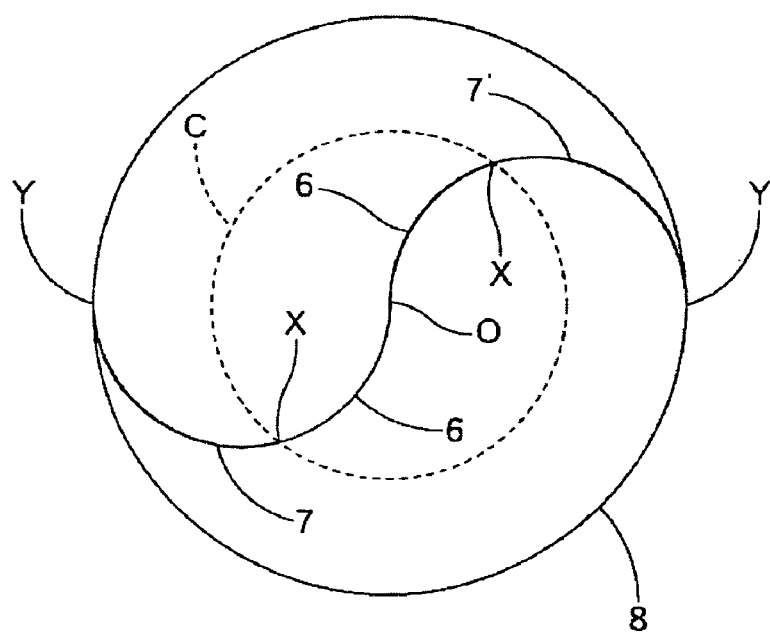
FIG. 7 A view for explaining bottom cutting edges and rounded corner cutting edges of a two-tooth radius endmill according to another embodiment.
Figure 9:
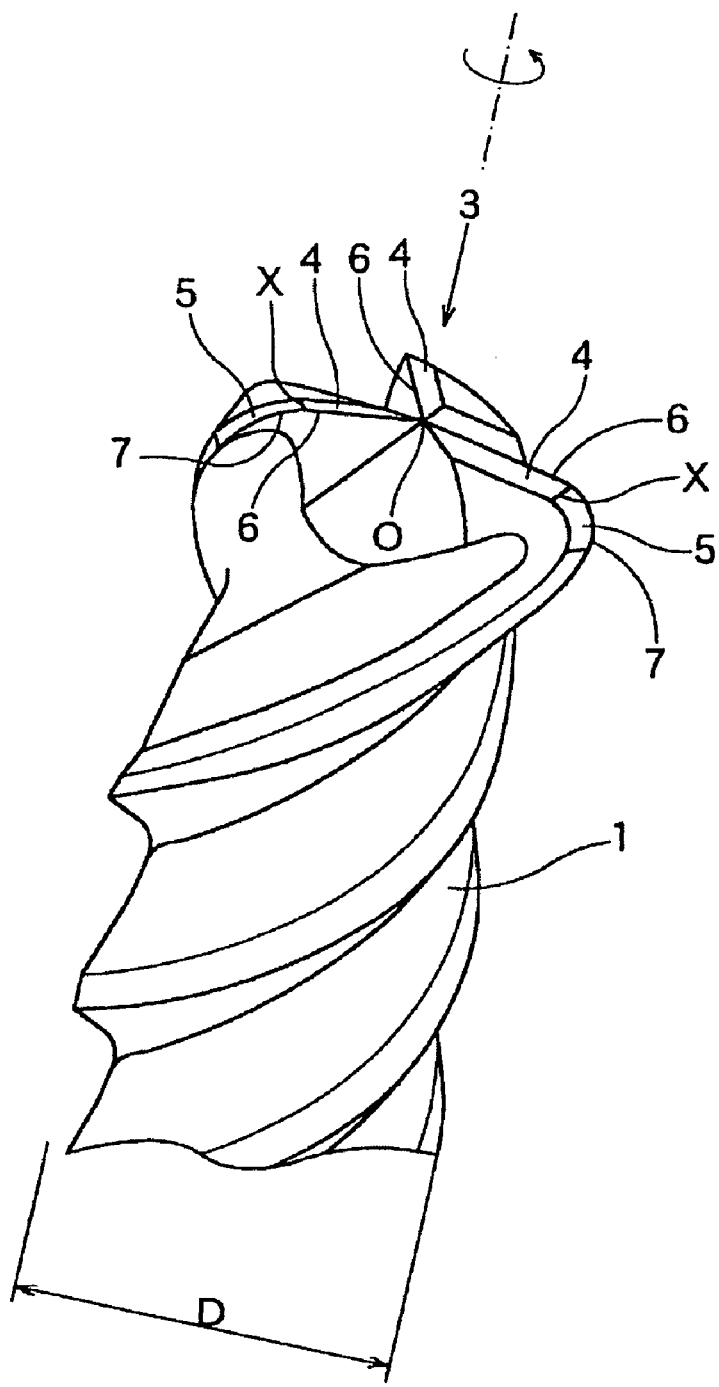
FIG. 9 A perspective view showing a major portion of a conventional radius endmill.
Figure 10:
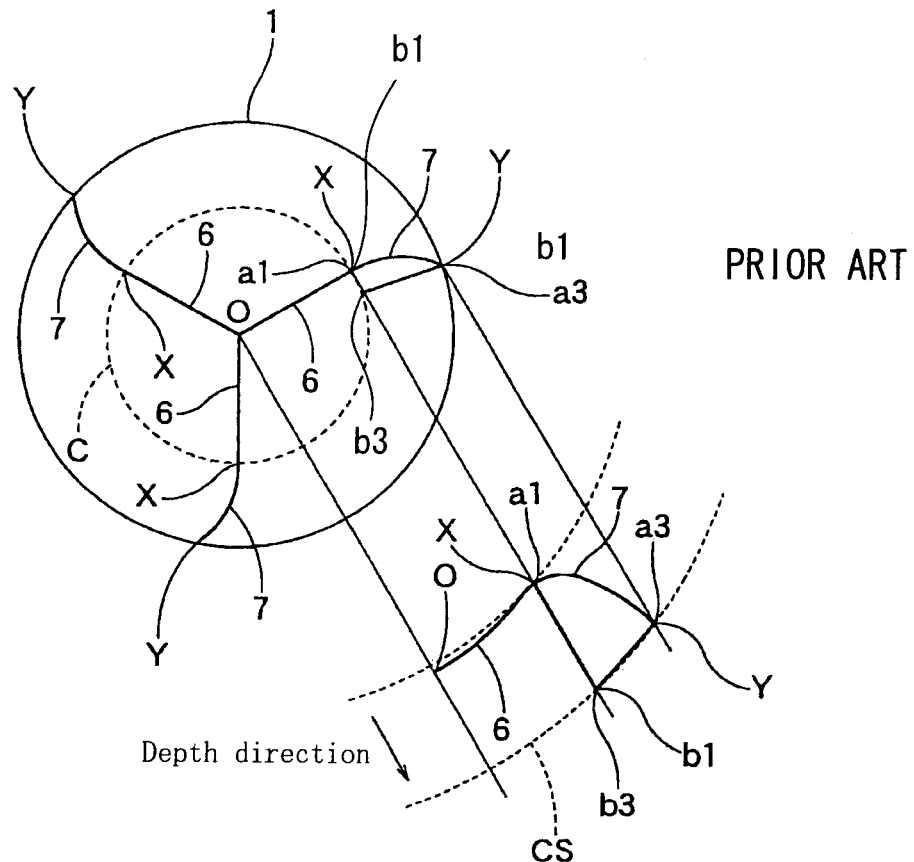
FIG. 10 A view for explaining bottom cutting edges and rounded corner cutting edges of the conventional radius endmill.
Figure 11:
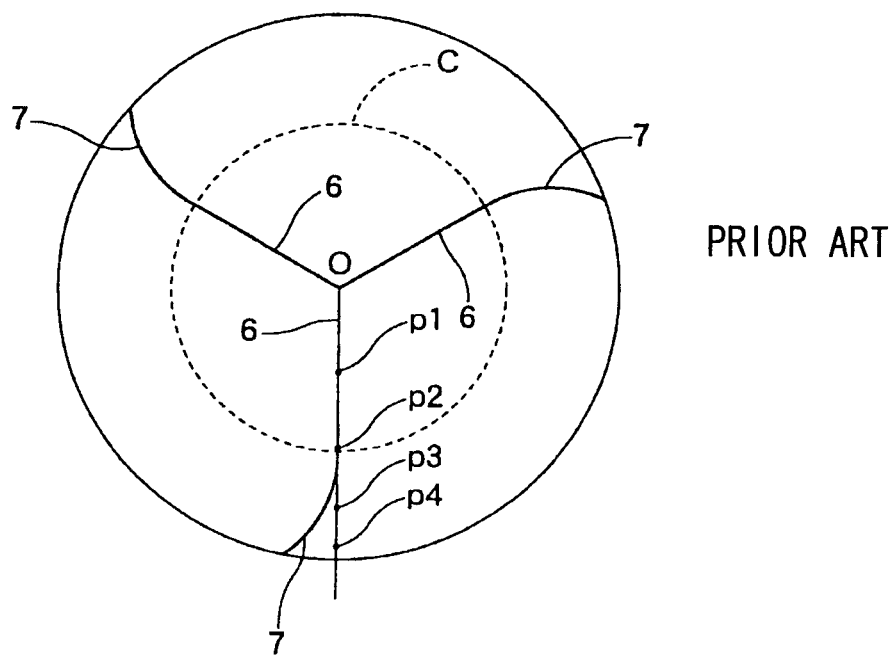
FIG. 11 A view for explaining effects of the conventional radius endmill.
Figure 12:
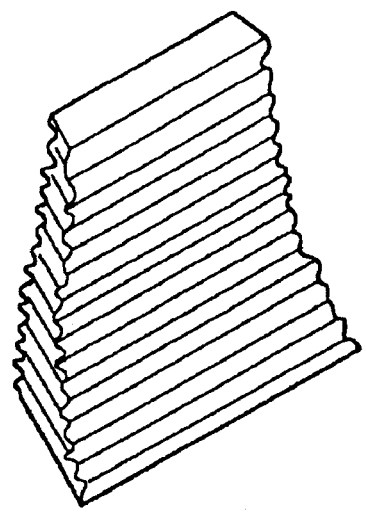
FIG. 12 A perspective view of a chip produced in a cutting operation using the conventional radius endmill.

1 outer peripheral portion
2 peripheral cutting edge
3 axial end portion
4 bottom cutting edge
5 rounded corner cutting edge
6 ridge line of the bottom cutting edge 4
7 ridge line of the rounded corner cutting edge 5
8 ridge line of the peripheral cutting edge 2
O center of the axial end portion
X free end of the ridge line 6
Y free end of the ridge line 7

I claim:

1. A radius endmill which has a substantially cylindrical shape and which is to be rotated about an axis thereof, and which has a plurality of teeth each including (a) a spiral-shaped peripheral cutting edge located in an outer peripheral portion of said endmill, (b) a bottom cutting edge located in an axial end portion of said endmill, and (c) a rounded corner cutting edge whose ridge line is defined by a circular arc having a given radius as measured in a side view of said endmill that is parallel to said axis, said rounded corner cutting edge being located in a corner portion of said endmill in which said outer peripheral portion and said axial end portion intersect each other such that said peripheral cutting edge and said bottom cutting edge are connected to each other through said rounded corner cutting edge, wherein said bottom cutting edge has a radially inner end lying at said axis, and a radially outer end at which said bottom cutting edge is connected to said rounded corner cutting edge, and wherein said bottom cutting edge is curved such that a ridge line of said bottom cutting edge is defined by a circular arc as seen in a plan view of said endmill that is perpendicular to said axis.

2. The radius endmill according to claim 1, wherein said circular arc defining said ridge line of said bottom cutting edge has a given radius of curvature as measured in said plan view, said given radius of curvature being not smaller than one-quarter of a diameter of said endmill and being not larger than one-half of said diameter.

3. The radius endmill according to claim 1, wherein said circular arc defining said ridge line of said bottom cutting edge has a given radius of curvature as measured in said plan view, said given radius of curvature being substantially one-quarter of a diameter of said endmill.

4. The radius endmill according to claim 2, wherein said rounded corner cutting edge has a radially inner end at which said rounded corner cutting edge is connected to said bottom cutting edge, and a radially outer end at which said rounded corner cutting edge is connected to said peripheral cutting edge, and wherein said circular arc defining said ridge line of said rounded corner cutting edge has a curvature that is substantially the same as a curvature of said ridge line of said bottom cutting edge as measured in said plan view.

5. The radius endmill according to claim 4, wherein said curvature of said circular arc defining said ridge line of said rounded corner cutting edge as measured in said plan view is substantially the same as a curvature of said circular arc defining said ridge line of said rounded corner cutting edge as measured in said side view.

6. The radius endmill according to claim 4, wherein said rounded corner cutting edge has centers of curvature which lie on an imaginary transverse plane that is distant from said radially outer end of said bottom cutting edge by a distance equal to said given radius of said ridge line of said rounded corner cutting edge in a direction parallel to said axis, and wherein said centers of curvature of said rounded corner cutting edge lie on a portion of an imaginary circle whose diameter is equal to a value obtained by subtracting twice said given radius from said diameter, said portion of said imaginary circle being not smaller than 1/24 of said imaginary circle and not larger than 1/6 of said imaginary circle.

7. The radius endmill according to claim 1, wherein said circular arc defining said ridge line of said bottom cutting edge is convex in a direction in which said endmill is to be rotated about said axis thereof.

8. The radius endmill according to claim 1, wherein a radial rake of said bottom cutting edge is negative.

9. The radius endmill according to claim 8, wherein an absolute value of said radial rake of said bottom cutting edge is gradually increased as viewed in a direction away from said axis toward said outer peripheral portion.

10. The radius endmill according to claim 1, wherein said bottom cutting edge is inclined with respect to a plane that is perpendicular to said axis such that said axial end portion has a concave cone shape.

11. The radius endmill according to claim 1, wherein said plurality of teeth consist of at least three teeth.

12. The radius endmill according to claim 1, wherein said plurality of teeth consist of at least two teeth.

* * * * *